United States Patent
Vyas et al.

(10) Patent No.: US 10,103,866 B2
(45) Date of Patent: Oct. 16, 2018

(54) PROVISIONING A DUAL MODE WIRELESS DEVICE FOR OPERATION IN ACCORDANCE WITH A LAYER-2 WIRELESS PROTOCOL AFTER BEING OPERATIONAL IN ACCORDANCE WITH ANOTHER LAYER-2 WIRELESS PROTOCOL

(71) Applicant: GainSpan Corporation, San Jose, CA (US)

(72) Inventors: Pankaj Vyas, Bangalore (IN); Sibasis Purohit, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 0 days.

(21) Appl. No.: 15/065,888

(22) Filed: Mar. 10, 2016

(65) Prior Publication Data
US 2017/0265066 A1 Sep. 14, 2017

(51) Int. Cl.
| | | |
|---|---|---|
| *H04L 5/22* | (2006.01) | |
| *H04W 4/80* | (2018.01) | |
| *H04W 8/18* | (2009.01) | |
| *H04W 84/12* | (2009.01) | |

(52) U.S. Cl.
CPC .............. *H04L 5/22* (2013.01); *H04W 4/80* (2018.02); *H04W 8/18* (2013.01); *H04W 84/12* (2013.01)

(58) Field of Classification Search
CPC ..... H04W 8/245; H04W 4/008; H04W 84/12; H04L 5/22
See application file for complete search history.

(56) References Cited

U.S. PATENT DOCUMENTS

| | | | |
|---|---|---|---|
| 8,599,814 B1 * | 12/2013 | Vleugels ............... | H04W 88/08 370/338 |
| 9,197,843 B2 | 11/2015 | Mast et al. | |
| 9,202,037 B2 | 12/2015 | Bultman | |
| 2007/0160017 A1* | 7/2007 | Meier .................. | H04W 36/18 370/338 |
| 2011/0025469 A1 | 2/2011 | Erdmann et al. | |
| 2012/0082077 A1* | 4/2012 | Zhang ............... | H04W 72/1215 370/311 |
| 2013/0191755 A1 | 7/2013 | Balog et al. | |

(Continued)

FOREIGN PATENT DOCUMENTS

CN 104851274 A 8/2015

OTHER PUBLICATIONS

M2MCombo™ 802.11n 1×1, Dual-mode BT 4.0, ZigBee, http://www.redpinesignals.com/pdfs/RS9113-PB.pdf, Redpine Signals, Inc, 2013, pp. 1-2.

(Continued)

*Primary Examiner* — Joseph Dean, Jr.
(74) *Attorney, Agent, or Firm* — Pearl Cohen Zedek Latzer Baratz LLP (57) ABSTRACT

A wireless device operates in a first wireless network using a first wireless protocol to receive a set of provisioning parameters for joining a second wireless network that uses a second wireless protocol. The first wireless network may be based on a shared wireless broadcast medium. The wireless device then joins the second wireless network using the set of provisioning parameters. In an embodiment the first wireless protocol is according to IEEE 802.11 specifications, while the second wireless protocol is according to IEEE 802.1.5.4 specifications.

21 Claims, 7 Drawing Sheets

(56) References Cited

U.S. PATENT DOCUMENTS

2015/0334759 A1* 11/2015 Hiramatsu .......... H04W 76/023
370/338
2016/0113048 A1* 4/2016 Barathalwar ......... H04W 8/005
455/11.1

OTHER PUBLICATIONS

Redpine Signals Introduces First Wireless M2M Combo Chip for The Internet of Things, http://www.prnewswire.com/news-releases/redpine-signals-introduces-first-wireless-m2m-combo-chip-for-the-internet-of-things-189806371.html, Downloaded circa Feb. 4, 2016, pp. 1-2.

ZigBee radio chip enables WiFi coexistence schemes, http://www.embedded.com/electronics-products/electronic-product-reviews/mcus-processors-and-socs/4410693/ZigBee-radio-chip-enables-WiFi-coexistence-schemes, Downloaded circa Feb. 4, 2016, pp. 1-4.

Colin Faulkner, Secure commissioning for ZigBee home automation using NFC, http://www.edn.com/Pdf/ViewPdf?contentItemId=4438456, EDN Network, Jan. 23, 2015, pp. 1-6.

Tao Jin, Guevara Noubir and Bo Sheng, WiZi-Cloud: Application-transparent Dual ZigBee-WiFi Radios for Low Power Internet Access, http://www.ccs.neu.edu/home/noubir/publications-local/JNS11.pdf, Northeastern University and University of Massachusetts Boston, pp. 1-9.

NFC Forum Technical Specifications, http://members.nfc-forum.org/specs/spec_list/, Downloaded circa Feb. 17, 2016, pp. 1-6.

Near Field Communication (NFC), https://en.wikipedia.org/wiki/Near_field_communication, Downloaded circa Feb. 17, 2016, pp. 1-4.

Subho Halder and Aditya Gupta, NFC—Near Field Communication, https://www.exploit-db.com/docs/23826.pdf, pp. 1-12.

* cited by examiner

PROVISIONING A DUAL MODE WIRELESS DEVICE FOR OPERATION IN ACCORDANCE WITH A LAYER-2 WIRELESS PROTOCOL AFTER BEING OPERATIONAL IN ACCORDANCE WITH ANOTHER LAYER-2 WIRELESS PROTOCOL

BACKGROUND OF THE INVENTION

Technical Field

Embodiments of the present disclosure relate generally to wireless networks, and more specifically to provisioning a dual mode wireless device for operation in accordance with a layer-2 wireless protocol after being operational in accordance with another layer-2 wireless protocol.

Related Art

A wireless device refers to a device which communicates with other devices/systems over a wireless medium. The communication is often based on a layer-2 protocol (generally defined consistent with ISO's OSI standard), which defines aspects such as medium access/sharing, addressing of individual devices, and various conventions as a basis for transfer of packets between wireless devices using the wireless medium. Higher layers such as Internet protocol (IP) are defined on top of the layer-2 protocol as is well known in the relevant arts.

Wireless devices are often designed to operate in dual mode, implying that a wireless device can operate with a first network based on a first wireless layer-2 protocol and also a second network based on a second layer-2 protocol. Such operation can be based on Time Division Multiplexing (TDM) or concurrent operation, even though the embodiments of the description herein are provided with respect to TDM operation.

However, for a wireless device to operate in dual mode, the device needs to be configured for operation according to both the layer-2 wireless protocols. For example, assuming that a wireless device is to operate with an IEEE 802.11 based wireless network (also referred to as WLAN/WiFi), and also with an IEEE 802.15.4 based wireless network (WPAN), the device may need to be configured with parameters such as network identifier and security credentials (including, for e.g., pass-phrase and security keys) of both of the networks.

There are often situations when a network device is operational in accordance with one of the wireless layer-2 protocols and is required to be configured for operation in accordance with the second wireless layer-2 protocol. Aspects of the present disclosure provide for such configuration, as described below with respect to examples.

BRIEF DESCRIPTION OF THE VIEWS OF DRAWINGS

Example embodiments of the present disclosure will be described with reference to the accompanying drawings briefly described below.

The drawing in which an element first appears is indicated by the leftmost digit(s) in the corresponding reference number.

DETAILED DESCRIPTION

1. Overview

A wireless device operates in a first wireless network using a first wireless protocol to receive a set of provisioning parameters for joining a second wireless network that uses a second wireless protocol. The first wireless network may be based on a shared wireless broadcast medium. The wireless device then joins the second wireless network using the set of provisioning parameters.

In an embodiment the first wireless protocol is according to IEEE 802.11 specifications, while the second wireless protocol is according to IEEE 802.1.5.4 specifications, with both the specifications being based on shared wireless broadcast medium.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1A:
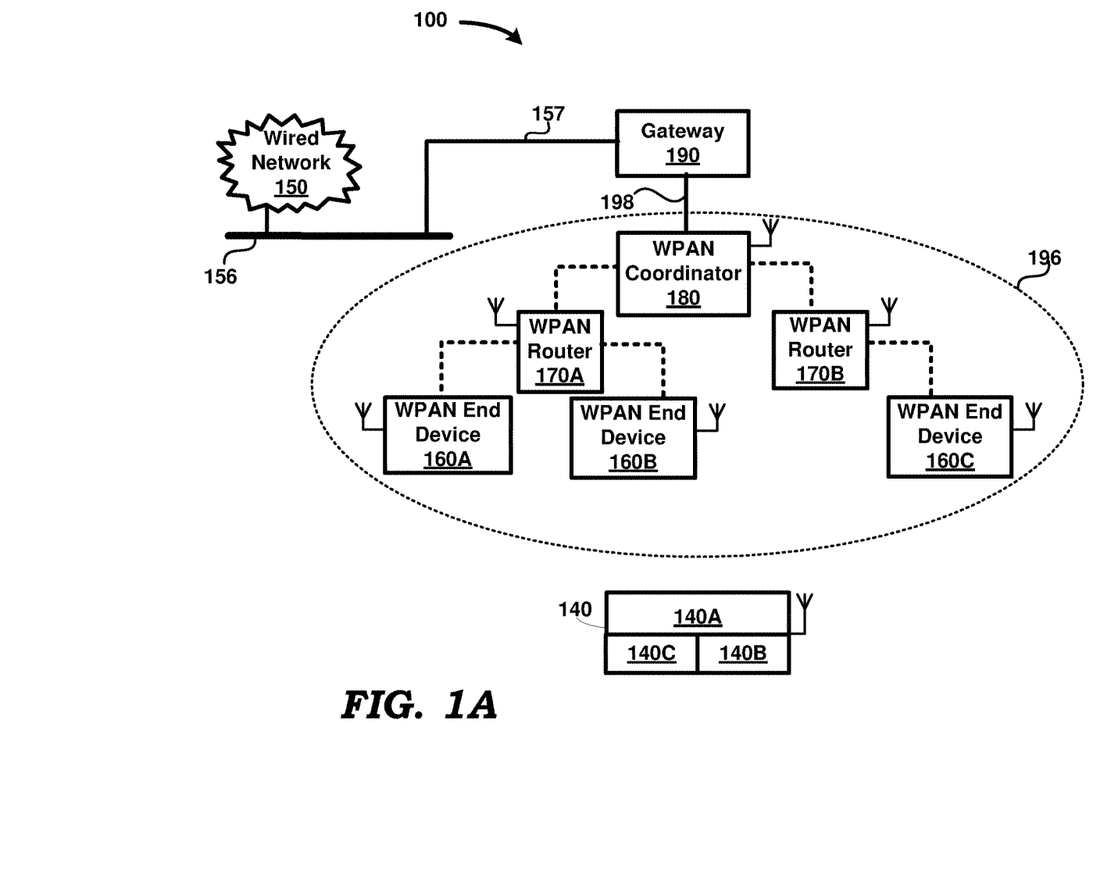
FIG. 1A is a block diagram showing partial details of an example environment in which several aspects of the present disclosure can be implemented.

FIG. 1A is a block diagram showing partial details of an example environment in which several aspects of the present disclosure can be implemented. The example environment is shown containing only representative systems for illustration. However, real-world environments may contain many more systems/components as will be apparent to one skilled in the relevant arts. System 100 of FIG. 1 is shown containing wireless device 140, wired network backbone 156, wired network 150, WPAN end devices 160A, 160B and 160C, WPAN routers 170A and 170B, WPAN coordinator 180 and gateway 190. Each wireless device of FIG. 1 is shown containing an antenna, though not numbered.

Wired network 150 may represent the World Wide Web or internet, and extends the connectivity of wireless devices in networks 196 and 197 to various systems (not shown) connected to, or part of, wired network 150. Wired network 150 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet may be encapsulated in the payload of layer-2 packets when being transported across wireless networks such as networks 196 and 197, described below.

Gateway 190 operates to connect devices in WPAN 196 (described below) with devices/systems in wired network 150 via path 157 and wired network backbone 156. Gateway 190 may perform the necessary protocol conversions before forwarding packets from/to wired network 150 to/from WPAN 196. Gateway 190 is shown connected to WPAN coordinator 180 through wired path 198 (although such connection could instead be through a wireless path also).

Wireless network (WPAN) 196 represents a wireless personal area network according to the IEEE 802.15.4 standard(s). WPAN 196 is shown containing WPAN end devices 160A, 160B and 160C, WPAN routers 170A and 170B, and WPAN coordinator 180. In an embodiment, the devices of WPAN 196 operate as a mesh network. The mesh network may be formed according to one of several well known specifications, such as for example, Zigbee IP, Zigbee Pro and THREAD, which run on top of IEEE 802.15.4 protocols. As is well known a mesh network is a network topology in which each node relays data for the network, with all mesh nodes cooperating in the distribution of data in the network. Only a few devices are shown in WPAN 196, which may typically contain many more devices (routers and end devices).

The devices of WPAN 196 of FIG. 1 represent a hierarchy, with WPAN coordinator 180 at the root of the hierarchy. End devices such as devices 160A-160C represent the leaves of the hierarchy, while routers such as routers 170A and 170B are intermediary devices. In an embodiment, WPAN coordinator 180 and WPAN routers 170A and 170B contain routing tables (each of which is populated with corresponding routing information during formation of WPAN 196, and updated whenever a new wireless device joins WPAN 196) to enable forwarding of a received frame to its destination end device. However, other techniques such as source routing can be employed in an alternative embodiment.

Routers 170A and 170B operate to forward packets to/from WPAN coordinator 180 from/to the corresponding source or destination end devices (the corresponding one of WPANs 160A, 160B and 160C), although routers 170A and 170B can also be sources and destination of packets. Each of routers 170A and 170B also represent a PAN coordinator (different from WPAN coordinator 180), in that the routers may transmit beacons to allow end devices to associate with it (i.e., router). The routers transmit respective beacons if WPAN 196 is a beacon-enabled network. When WPAN 196 is not a beacon-enabled network, any node wishing to join WPAN 196 transmits scan request(s). All nearby (i.e., within communication range) routers respond with corresponding scan responses in a corresponding frequency band identified by a channel number. The device wishing to join WPAN 196 selects one of the responding routers as its parent, and can join WPAN 196 by associating with the parent.

WPAN end devices 160A-160C represent sources or destinations for packets, and may correspond, for example, to sensors (e.g., temperature and pressure sensors).

In FIG. 1, it is assumed that WPAN router 170A is the parent node of end devices 160A and 160B, while WPAN router 170*b* is the parent node of end device 160C. WPAN coordinator 180 is the parent node of each of routers 170A and 170B. The parent node-child node relationship is represented in FIG. 1 by dotted lines.

The communication between a pair of devices in WPAN 196 uses the layer-2 wireless protocol specified by the IEEE 802.15.4 specification. Communication using the layer-2 wireless protocol specified by the IEEE 802.15.4 specification implies that devices of WPAN 196 acquire access to the wireless medium according to multiple access techniques specified by IEEE 802.15.4, form data frames according to formats specified by IEEE 802.15.4, transmit data frames using modulation specified by IEEE 802.15.4, etc.

The devices of WPAN 196 share a wireless broadcast medium. As is well known in the relevant arts, the term 'shared wireless broadcast medium' implies that a packet (or frame) transmitted (i.e., by radiating, as against inductive coupling) on the shared wireless broadcast medium is receivable (i.e., available for reception) by multiple devices sharing the wireless broadcast medium and within the communication range of the transmitter.

All the devices of WPAN 196 typically have the same network identifier (ID) (also termed Personal Area Network or PAN identifier). The PAN ID may be specified (entered in) to WPAN coordinator 180 for example by an operator or administrator. As part of formation of the mesh network, each of the other devices in WPAN 196 obtains the PAN ID.

Wireless device 140 represents device which can be either an end device (e.g., wireless station) or a switch (e.g., access point in case of WLAN technology, coordinator in WPAN and/or router in mesh networks). Wireless device 140 is shown operating in dual-mode to operate as an IEEE 802.11 WLAN device as well as an IEEE 802.15.4 WPAN device. For convenience of reference, the portion of wireless device 140 capable of operating as a WPAN device is referred to herein as WPAN device 140A, and the portions capable of operating as a WLAN access point (AP) and WLAN wireless station (STA) device are referred to herein respectively as AP 140B and STA 140C.

In an embodiment, wireless device 140 is implemented to contain an integrated circuit (IC) that contains circuitry/circuit blocks for effecting all the RF (Radio Frequency), baseband and MAC portions for both the WLAN as well as WPAN functionality, and is described further in sections below. However, in other embodiments, such functionality as noted above may be realized using more than one IC, for example using multiple ICs/modules and/or discrete components.

In order for WPAN device 140A to join WPAN 196, WPAN device 140A requires parameters such as the network ID of WPAN 196, as well as the network security credential(s) (including, for example, pass phrase and security keys) needed to authenticate with a node (e.g., a router or WPAN coordinator 180) of WPAN 196. Thus, WPAN device 140A needs to be provisioned (or commissioned) first with such parameters. In a prior technique, a device such as wireless device 140 is connected to a personal computer (PC) via a serial port, and the provisioning parameters are downloaded to (WPAN device 140A portion of) wireless device 140 from the PC. However, such a technique requires a PC, and a serial link between wireless device 140 and the PC. The prior technique may be cumbersome, or a serial interface may not be available on wireless device 140.

Figure 1B:
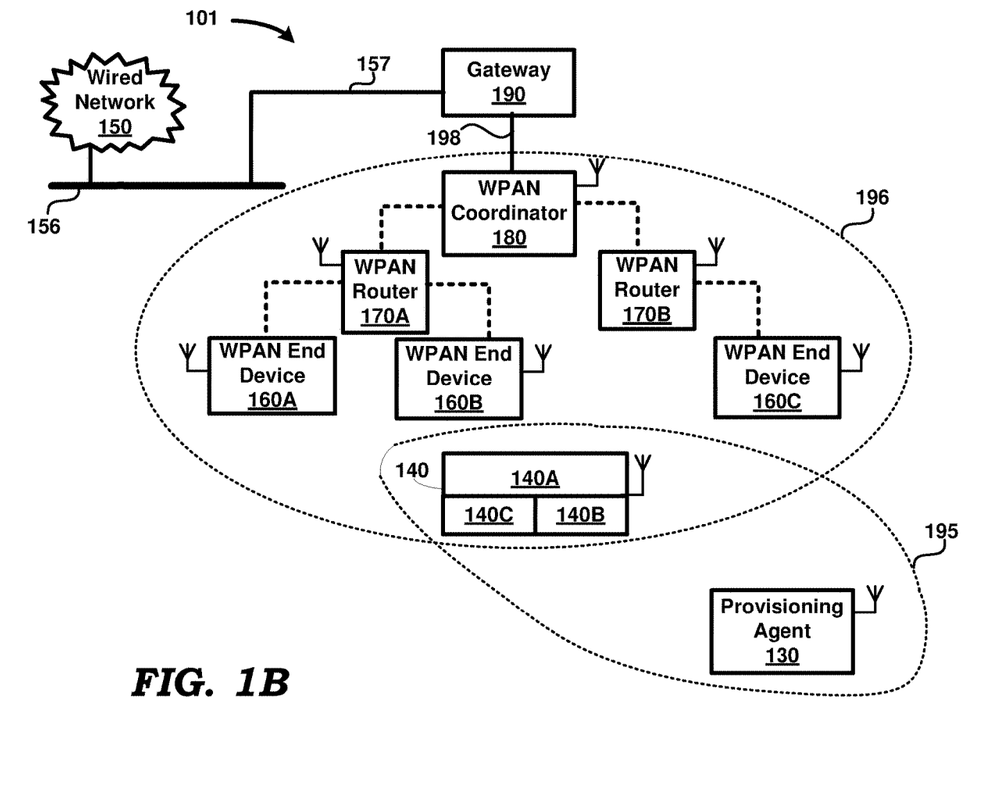
FIG. 1B is a block diagram showing some more details of an example environment in which several aspects of the present disclosure can be implemented.

The availability of a WLAN device (e.g., AP 140B) on the same device or chip as WPAN device 140A lends to easy provisioning of WPAN device 140A using the WLAN device, since WLAN devices are ubiquitously available. Thus, according to an aspect of the present disclosure, wireless device powers-up as AP 140B, and communicates with a provisioning agent of an IEEE 802.11 WLAN network using the IEEE 802.11 layer-2 protocol. System 101 of FIG. 1B is shown containing all the devices of FIG. 1A, and additionally containing provisioning agent 130. Provisioning agent 130 is a wireless station capable of operating according to IEEE 802.11 protocol, and corresponds to a mobile phone in an embodiment. Optionally (although not shown in FIG. 1), AP 140B may be connected to wired network 150, and thereby provides connectivity between systems on wired network 150 and provisioning agent 130.

The combination of AP 140B and provisioning agent 130 represents a basic service set (BSS) of a wireless local area network (WLAN 195 (first wireless network)) according to the IEEE 802.11 family of standard(s) (including as specified in amendments/revisions such IEEE 802.11a, 802.11b, 802.11i, 802.11g and 802.11n). Communication (transmission and reception of data frames) between AP 140B and provisioning agent 130 uses the layer-2 (data-link layer, including medium access control or MAC layer) wireless protocol specified by IEEE 802.11 (first wireless protocol).

Communication using the layer-2 wireless protocol specified by IEEE 802.11 implies that AP 140B and provisioning agent 130 acquire access to the wireless medium according to multiple access techniques specified by IEEE 802.11, form data frames according to formats specified by IEEE 802.11, transmit data frames using modulation specified by IEEE 802.11, etc. The devices in WLAN 195 transmit and receive frames on a shared wireless broadcast medium. As is well known in the relevant arts, term 'shared wireless broadcast medium' implies that a packet (or frame) transmitted (by radiating, as against inductive coupling) on the shared wireless broadcast medium is receivable (i.e., available for reception) by all devices sharing the wireless broadcast medium. Thus, all devices sharing the wireless broadcast medium are within a one-hop communication distance from each other.

Thus, wireless device 140 is (already) operational in accordance with one wireless layer-2 protocol (here IEEE 802.11) and is required to be configured (commissioned or provisioned) for operation in accordance with another wireless layer-2 protocol (here IEEE 802.15.4). It is noted here that IEEE 802.11 and IEEE 802.15.4 are technologies in which data transfer from a transmitter and a receiver is through radiative coupling.

The manner in which the provisioning/commissioning noted above is performed for a dual-mode device is described next with respect to a flowchart.

3. Wireless Device Commissioning

Figure 2A:
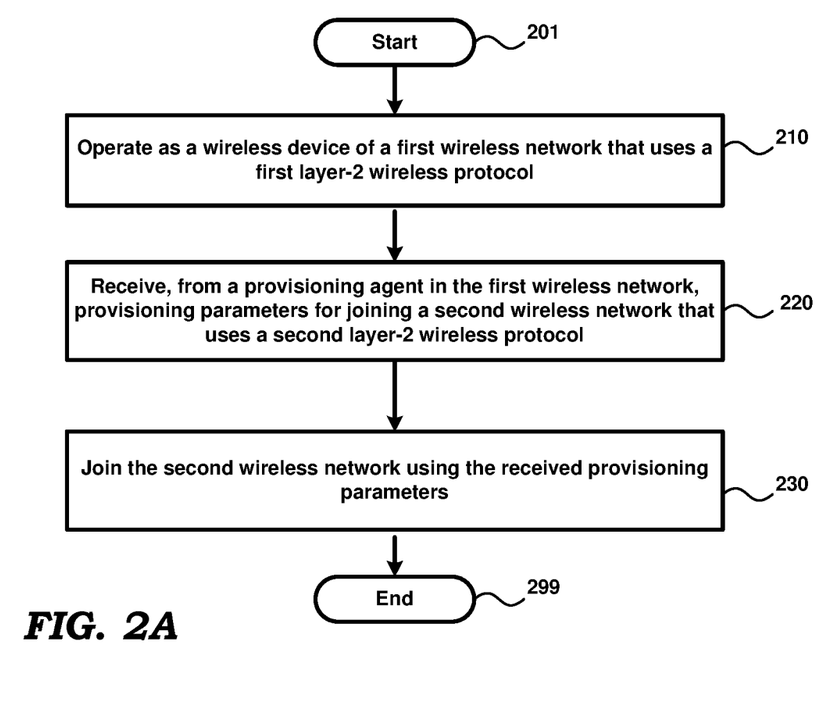
FIG. 2A is a flowchart illustrating the operation of a wireless device, in an embodiment of the present disclosure.

FIG. 2A is a flowchart illustrating the operation of a dual-mode wireless device, in an embodiment. The flowchart is described with respect to the environment of FIG. 1B, and in relation to wireless device 140, merely for illustration. However, various features described herein can be implemented in other environments and using other components as well, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, wireless device 140 operates as a wireless device of a first wireless network that uses a first layer-2 wireless protocol. Control then passes to step 220.

In step 220, wireless device 140 receives, from a provisioning agent in the first wireless network, a set of provisioning parameters for joining a second wireless network that uses a second layer-2 wireless protocol. The provisioning parameters may include network ID of the second wireless network, security credentials (including for e.g., pass-phrase and security keys) required for joining the second wireless network, channel number in which to operate in the second network, and the type of device ('device type', e.g., whether end device or router) to operate as in the second network. Control then passes to step 230.

In step 230, wireless device 140 joins the second wireless network using the received provisioning parameters. Joining the second wireless network implies that wireless device 140 becomes a part of (i.e., a device in) the second wireless network, and can therefore transmit packets to and receive packets from other devices in the second wireless network using the second layer-2 wireless protocol. In addition, using a layer-3 protocol (e.g., as specified by Zigbee Pro), WPAN device 140A can also exchange packets with devices in wired network 150. Control then passes to step 299, in which the flow chart ends.

The details of the operations of the steps of flowchart of FIG. 2 are illustrated next with respect to FIG. 1B in an example scenario.

Wireless device 140 powers up as AP 140B, and transmits beacons. To indicate that AP 140B is requesting for provisioning parameters for enabling WPAN device 140A to join WPAN 196, AP 140B transmits a message, for example, in an information element (IE) field in the beacon or a probe response message. In an embodiment, the message contains the last three bytes of the medium access control (MAC) address of AP 140B. An example (pre-arranged) message is the string 'GS-PROV-010203', address "00: 1D: C9: 01: 02: 03" being the MAC address of AP 140B.

Provisioning agent 130 operates as a WLAN wireless station (STA), and scans for beacons. Alternatively, provisioning agent 130 may proactively transmit a probe request message, and receive a probe response message as a reply. On receipt of either a beacon, or a probe response message from AP 140B, provisioning agent 130 examines the contents in an IE field of the beacon/probe response message. On determining that the IE field contains a pre-arranged message (e.g., 'GS-PROV-010203', noted above), provisioning agent 130 associates and authenticates with AP 140B, and may also obtain security keys (e.g., according to WPA-1 or WPA-2) to be used in encrypting and decryption communications with AP 140B. The parameters for enabling provisioning agent 130 to associate with AP 140B may be made available to the user of provisioning agent 130.

After joining network 195 (i.e., associates with AP 140B), provisioning agent 130 transmits to AP 140B, in corresponding data frame(s), the provisioning parameters needed to enable joining of WPAN device 140A in WPAN 196. The provisioning parameters needed to enable joining of WPAN device 140A in WPAN 196 may be obtained from an operator/user of WPAN 196. It is noted that the provisioning parameters for WPAN device 140A may be transmitted either directly, or after encryption using the security keys, noted above. Thus, the provisioning of WPAN device 140A can happen with AP 140B and provisioning agent 130 operating either in open mode or secure mode.

As noted above, the provisioning parameters needed to enable joining of WPAN device 140A in WPAN 196 include network ID of the second wireless network, security credentials (including for e.g., pass-phrase and security keys) required for joining the second wireless network, channel number in which to operate in the second network, and the 'device type'. In an embodiment of the present disclosure, the provisioning parameters include the network ID, passphrase required for joining the second wireless network, channel number, and device type.

After joining WPAN 196, and based on the pass-phrase, WPAN device 140A derives security keys in coordination with WPAN router 170A using a corresponding technique (for example, as specified by Zigbee IP, Zigbee Pro or THREAD). The security keys (e.g., encryption and decryption keys) may be used for encrypting data to be transmitted by WPAN device 140A and decrypting data received by WPAN device 140A respectively. Instead of separate encryption and decryption keys, a same key may also be used for both encryption and decryption. Separate security keys may be derived and used for encryption/decryption of unicast and multicast/broadcast data.

In another embodiment, the security keys (encryption/decryption keys for unicast and/or multicast/broadcast data) are directly received (rather than having to be derived) by wireless device (operating as AP 140B) as part of the provisioning parameters from provisioning agent 130.

In yet another embodiment, data specifying the technique and/or algorithm to be used for deriving and/or encrypting the security keys, or the initial value of a counter or an initialization vector used to generate the security key(s) are directly received (in addition to the other provisioning parameters) by wireless device (operating as AP 140B) from provisioning agent 130. Example techniques for deriving the security keys include Wi-Fi Protected Access (WPA), Wi-Fi Protected Access II (WPA2), Rivest-Shamir-Adleman (RSA) and Elliptic Curve Cryptography (ECC). Example algorithms used for encrypting security keys include Advanced Encryption Standard (AES), Temporal Key Integrity Protocol (TKIP), Data Encryption Standard (DES), Rivest Cipher 4 (RC4), and HASH algorithm (i.e. SHA, MD5, AES). WPAN device 140A then derives the security keys (without further interaction with WPAN router 170A) according to the corresponding technique or algorithm.

In an embodiment, AP 140B runs a provisioning webpage. The user of provisioning agent 130 can access the webpage, and enter the desired provisioning parameters for WPAN device 140A. AP 140B may store the received provisioning parameters in a memory, which can be accessed by wireless device 140 when operating as WPAN device 140A.

Wireless device 140 then switches to operation as WPAN device 140A, and retrieves the provisioning parameters stored in the memory by AP 140B. WPAN device 140A then scans the corresponding WPAN channels for beacons from WPAN devices (or alternatively proactively transmits scan requests on the respective channels). The specific channel(s) (defined by the frequency band in which to transmit/receive) to be scanned may correspond with the channel number(s) obtained as part of the provisioning parameters.

As noted above, routers 170A and 170B may either broadcast respective beacons at regular intervals, or respond with scan responses to any scan requests (on specific channel) received from WPAN device 140A. Since WPAN device 140A has the network ID of WPAN 196 (obtained as one of the provisioning parameters), if the network ID in a received beacon or scan response matches the network ID available with WPAN device 140A, WPAN device 140A concludes that WPAN device 140A can associate with the corresponding router.

When beacons from multiple routers are received, WPAN device 140A can choose to join that router whose received signal strength (RSSI) is greater/greatest. Thus, assuming that the signal from WPAN router 170A as received at WPAN device 140A is greater than that of WPAN router 170B, WPAN device 140A associates with WPAN router 170A. Thus, WPAN device 140A may exchange association and authentication frames with WPAN router 170A. During authentication, WPAN device 140A provides the passphrase obtained as part of the provisioning parameters.

Once association and authentication are complete, WPAN 140A becomes part of WPAN 196. WPAN device 140A may obtain an IP address, for example, from a Dynamic Host Configuration Protocol (DHCP) server, which may, for example, be contained in WPAN coordinator 180. Thereafter, WPAN device 140A operates as an end device to transmit/receive data frames to/from other devices of WPAN 196, as well as devices in wired network 150. WPAN device 140A may correspond, for example, to a sensor, and may collect sensor readings (e.g., temperature, pressure, etc.), and transmit the readings to a server on wired network 150.

It is to be understood however that although WPAN device 140A is described as operating as an end device, in other embodiments, WPAN device 140A can operate as a router or a WPAN coordinator also (and operate to participate in creation of a WPAN network) depending on the 'device type' provisioning parameter received for provisioning, and the specific topology of WPAN 196. In other words, device 140A operates as a WPAN coordinator for one value (received) of 'device type', as a WPAN router for a second received value for 'device type', and as a WPAN end device for a third received value for 'device type'.

WPAN device 140A uses the layer-2 protocol specified by IEEE 802.15.4 in transmitting and receiving frames. Communication using the layer-2 wireless protocol specified by IEEE 802.15.4 implies that WPAN device 140A (as well as the other devices of WPAN 196) acquires access to the wireless medium according to multiple access techniques specified by IEEE 802.15.4, form data frames according to formats specified by IEEE 802.15.4, transmit data frames using modulation specified by IEEE 802.15.4, etc. Devices in WPAN 196 also transmit and receive frames on a shared wireless broadcast medium. In an embodiment of the present disclosure, frames transmitted and received by WPAN device 140A on WPAN 196 are encrypted using corresponding encryption and decryption keys obtained as noted above.

Once, WPAN device 140A has thus been provisioned, in addition to operation in WPAN 196, wireless device 140 may start operating in a time-division multiplexed (TDM) fashion to operate alternately as WPAN device 140A and a wireless station (STA 140C) of an IEEE 802.11 network, as described next.

4. Post-Provisioning Operations

Figure 2B:
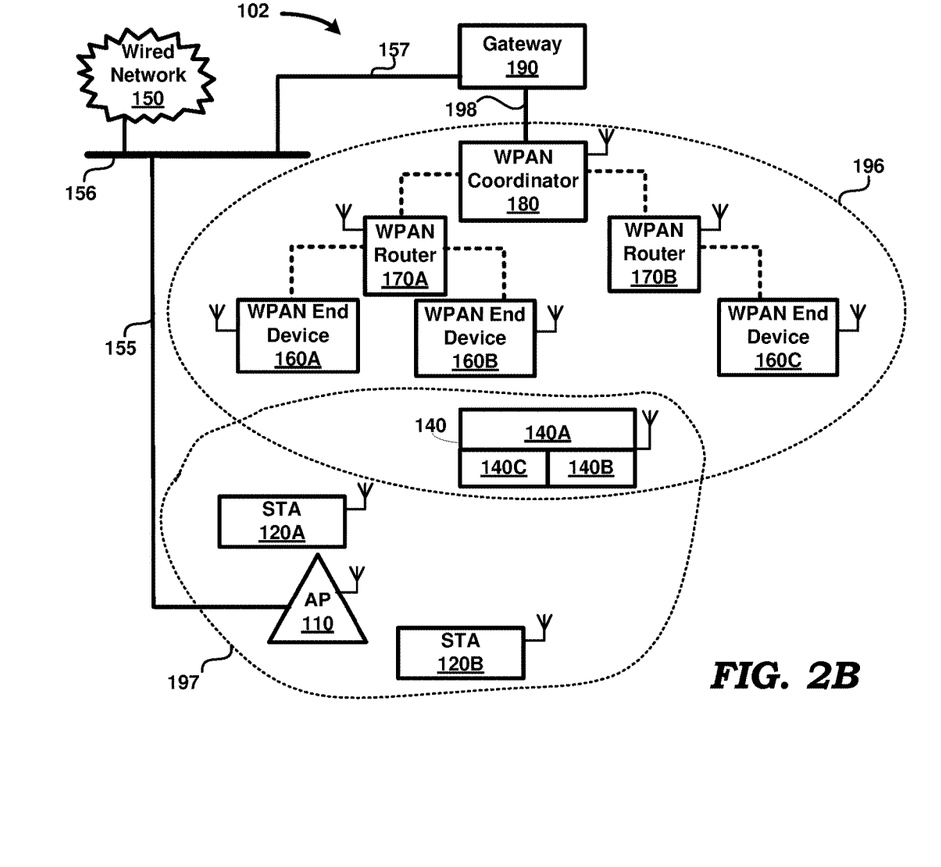
FIG. 2B is a block diagram showing other details of an example environment in which several aspects of the present disclosure can be implemented

System 102 of FIG. 2B is shown containing all the devices/systems of FIG. 1B, and additionally containing devices AP 110, and STAs 120A and 120B. AP 110 and STAs 120A and 120B form a basic service set (BSS) of another wireless local area network (WLAN 197) according to the IEEE 802.11 family of standard(s). However, other embodiments may include more than one BSS, with the BSSs being interconnected to form an extended service set (ESS) consistent with IEEE 802.11 standards, as is well known in the relevant arts.

AP 110 represents a switching device of WLAN 197 (third wireless network), and enables STAs of WLAN 197 to communicate with each other, and also with devices in wired network 150. AP 110 is shown connected to wired network 150 via path 155 and wired network backbone 156. STAs 120A and 120B may correspond, for example, to a laptop computer, smart phone, or a wireless sensor.

As noted above, after provisioning of WPAN device 140A is complete, wireless device 140 operates alternately as WPAN device 140A and STA 140C. STA 140C is a wireless station capable of operating as part of a WLAN network, such as WLAN 197.

Figure 3:
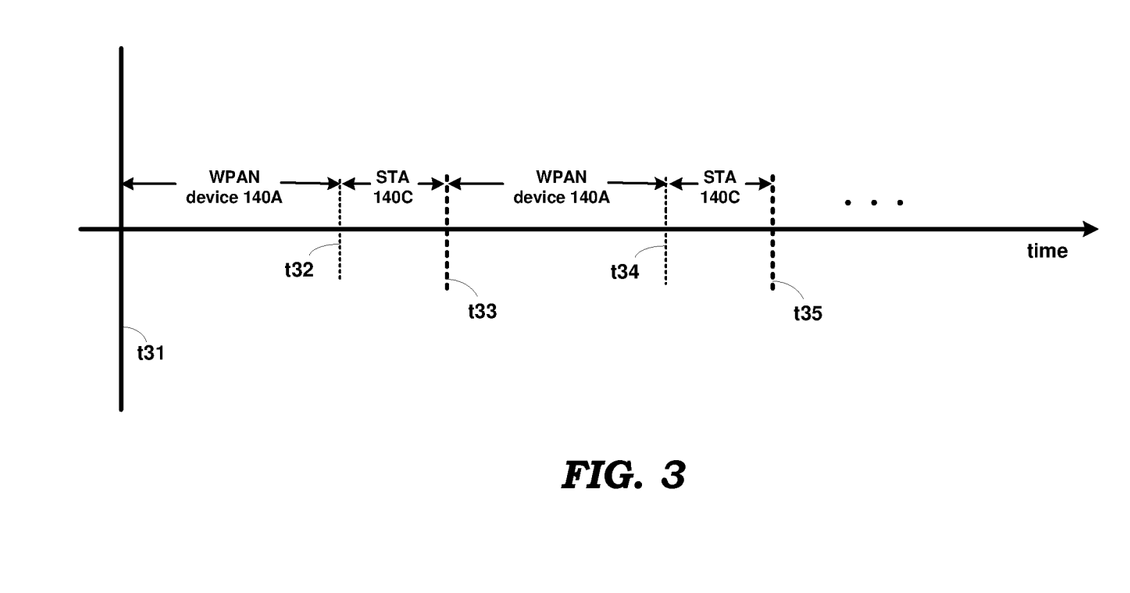
FIG. 3 is a timing diagram illustrating the time-division multiplexed operation of a wireless device as a wireless station and a WPAN end device, in an embodiment of the present disclosure.

FIG. 3 illustrates an example of TDM operation between WPAN device 140A and STA 140C in an embodiment.

It is assumed that WPAN device 140A has joined WPAN 196 sometime prior to time instant t31. In interval t31-t32, wireless device 140 operates as WPAN device 140A, and may transmit and/or receive frames to/from other devices as noted above. At, or slightly prior to t32, WPAN device 140A may be set to power-down mode. In power-down mode, at least a portion of hardware circuitry required for operation as WPAN device 140A is powered-down, or the clock to such (digital) portions may be gated off. At t32, wireless device switches to operating as STA 140C, which associates and authenticates with AP 110 sometime in interval t32-t33. The parameters (e.g., BSS ID of network 197, pass-phrase/security credentials for joining network 197) for such association and authentication may be received by AP 140B (during operation of wireless device 140 as AP 140B) from provisioning agent 130 in addition to the parameters noted in step 220 of FIG. 2, although not noted above), and provided to STA 140C via a shared memory in wireless device 140.

Thus, STA 140C becomes a part of WLAN 197. Communication between STA 140C and AP 110 (as well as between other devices of WLAN 197) uses the layer-2 wireless protocol specified by IEEE 802.11 (first wireless protocol). Thus, the devices of WLAN 197 acquire access to the wireless medium according to multiple access techniques specified by IEEE 802.11, form data frames according to formats specified by IEEE 802.11, transmit data frames using modulation specified by IEEE 802.11, etc. The devices in WLAN 197 transmit and receive frames on a shared wireless broadcast medium. STA 140C may also obtain an IP address from a DHCP server.

Referring again to FIG. 3, at t33, wireless device 140 switches to operation again as WPAN device 140A till t34. At t34, wireless device switches to operation as STA 140C, and the alternating operations as WPAN device 140A and STA 140C continue, although not indicated in FIG. 3. In an embodiment, the operating intervals (e.g., t31-t32) of WPAN device has a duration of 400 milliseconds (ms), and the operating interval (e.g., t32-t33) of STA 140C has a duration of 100 ms. However, in other embodiments, other durations for the operating intervals may be used.

In an embodiment of the present disclosure, STA 140C operates to assist in maintenance operations of the devices (including WPAN device 140A) in WPAN 196. Thus, status (e.g., remaining battery power, whether device is functioning correctly or not) of devices in WPAN 196 may be collected by WPAN device 140A (during operating intervals of wireless device 140 as WPAN device 140A, such as t33-t34) and forwarded to STA 140C (for example via a shared memory). STA 140C transmits (during operating intervals of wireless device 140 as STA 140C, such as t34-t35), via AP 110, the received status information to a maintenance and control server located in wired network 150.

STA 140C may receive control commands from the maintenance and control server in its operating intervals, and forward the commands to WPAN device 140A, which in turn forwards the commands to corresponding device of WPAN 196 in its operating intervals. An example type of control command is the frequency with which sensor data is to be collected by the corresponding WPAN devices in WPAN 195. Various other commands may also be sent to WPAN device 140A from the maintenance and control server via STA 140C.

Additionally, any firmware updates to be loaded on the devices of WPAN 195 may be sent to STA 140C via AP 110 by the maintenance and control server, during some operating interval of STA 140C. STA 140C forwards the updates to WPAN device 140A (via the shared memory), and WPAN device 140A in turn forwards the updates to WPAN router 170A, during some operating interval of WPAN device 140A. WPAN router 170A updates its firmware, and forwards the firmware upgrades further to WPAN coordinator 180, which distributes the upgrades eventually to all the other devices in WPAN 196 as well.

Since the data rate achievable by WLAN 197 is greater than that achievable in WPAN 195, firmware upgrades to the devices of WPAN 196 can be made faster. Additionally, STA 140C can determine (based on internal communication with WPAN device 140A) if WPAN device 140A could successfully join WPAN 196. Thus, STA 140C transmits, to the maintenance and control server (noted above), information specifying whether WPAN device 140A has successfully joined WPAN 196 or not.

In an embodiment of the present disclosure, the start of operating intervals in which wireless device 140 operates as WPAN device 140A is aligned with start of beacon transmissions of WPAN router 170A. The beacon may indicate whether any data for WPAN device 140A is buffered in WPAN router 170A. WPAN device 140A may obtain the buffered data (e.g., 'status' data as noted above) by requesting WPAN router 170A for such data. In another embodiment, there is no alignment of the start of operating intervals of WPAN device 140A with respect to start of beacon transmissions by WPAN router 170A, and WPAN device 140A may simply request for data from WPAN router 170A without waiting for any beacon.

In an alternative embodiment, once wireless device 140 (operating as WPAN device 140A) has joined WPAN 196, instead of operating thereafter as a wireless station (STA 140C) and WPAN device 140A in a time-division multiplexed (TDM) manner as described above (e.g., with respect to FIG. 3), wireless device 140 instead operates alternately as WPAN device 140A and AP 140B in a TDM manner. Thus, the operations (maintenance/status collection of remaining battery power, control/command, firmware updates of devices in WPAN 196, etc, as described above) performed by STA 140C may instead be performed by AP 140B, with the difference that AP 140B interacts with provisioning agent 130 (rather than with the maintenance and control server noted above). Provisioning agent 130 may contain the necessary software to facilitate such operations (for example, under control of a user of provisioning agent 130).

In yet another embodiment, once wireless device 140 (operating as WPAN device 140A) has joined WPAN 196, wireless device 140 thereafter operates in successive intervals (which may repeat) as WPAN device 140A, STA 140C and AP 140B in a TDM manner. In the embodiment, the maintenance, control/command, firmware update of devices in WPAN 196, etc., as described above with respect to FIG. 3 may be performed by one or both of STA 140C and AP 140B in corresponding operating intervals. For example, some of the operations (e.g., firmware updates) may be done by STA 140C based on commands received from the maintenance and control server, while other operations (maintenance/status updates etc.) may be done by AP 140B.

Figure 4:
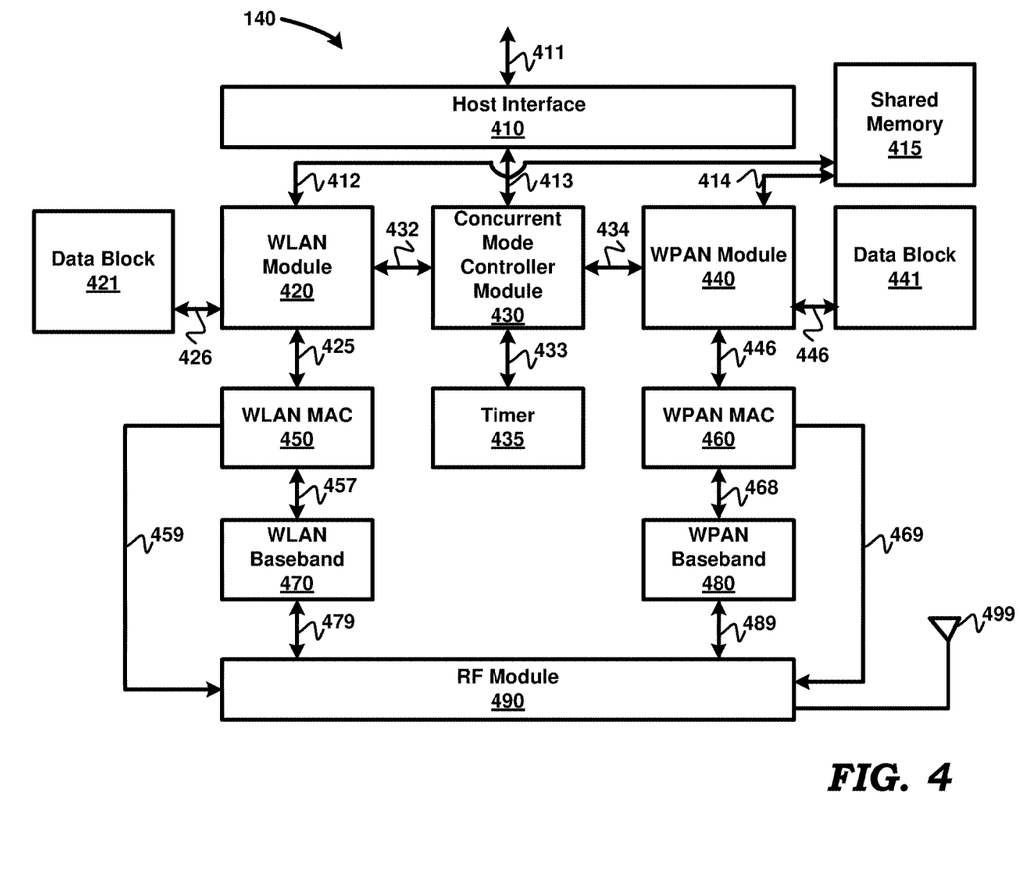
FIG. 4 is a block diagram illustrating the details of a wireless device, in an embodiment of the present disclosure.

The block-level implementation details of wireless device 140 in an embodiment are described next.

5. Wireless Device

FIG. 4 is a diagram illustrating block-level implementation details of wireless device 140, in an embodiment of the present disclosure. Wireless device 140 is shown containing host interface 410, shared memory 415, WLAN module 420, WLAN MAC 450, WLAN baseband 470, WPAN module 440, WPAN MAC 460, WPAN baseband 480, RF module 490, antenna 499, concurrent mode controller module 430, timer 435, data block 421 and data block 441. The combination of modules 420, 450 and 470 is termed herein as "WLAN chain". The combination of modules 440, 460 and 480 is termed herein as "WPAN chain". All of the components of wireless device 140 may be integrated on a same integrated circuit (IC) (except antenna 499). Alternatively, multiple ICs in combination with discrete components may be used to implement wireless device 140.

When wireless device 140 operates as AP 140B, WLAN module 420 receives, via blocks 450, 470 and 490, provisioning parameters from provisioning agent 130 for enabling wireless device to join WPAN 196 described above. WLAN module 420 stores the provisioning parameters in shared memory 415 via path 412. WLAN module 420 retrieves, from data block 421, data representing the parameters that are to be transmitted in beacons, as well as any other data/parameters (e.g., beacon interval to be used by AP 140B, keys to be used for encryption and decryption of data, etc.) for delivery to provisioning agent 130, and forwards such data and parameters to WLAN MAC 450 on path 425.

When wireless device 140 operates as STA 140C, WLAN module 420 receives, via blocks 450, 470 and 490, data destined for use (or further forwarding) by WPAN device 140A. WLAN module 420 stores such data in shared memory 415. The data may represent firmware upgrades for devices in WPAN 196. WLAN module 420 retrieves, from shared memory 415, data generated or received by WPAN device 140A, and forwards the data to WLAN MAC 450. Such data may represent 'status' of various operational parameters of devices in WPAN 196, as noted above. Any data other than that that received from WPAN device 140A, may be retrieved from data block 421 by STA 140C and forwarded to WLAN MAC 450. Similarly, STA 140C may store data received from WLAN MAC 450 that is not intended for delivery to WPAN device 140A in data block 421.

In an embodiment, WLAN module 420 is implemented as corresponding software instructions executed by one or more processors.

WLAN MAC 450 performs medium access control operations to enable transmission and reception of data from/to AP 140B (and STA 140C). WLAN MAC 450 forms data frames (the data may be obtained in the manner described above with respect to block 421, shared memory 415 and data block 421) and other frames (e.g., management frames) according to WLAN standards. In an embodiment, WLAN MAC 450 is implemented using a combination of software instructions and hardware blocks (primarily registers and queues). The software instructions form the data/management frames noted above, and store the frames in corresponding hardware queues contained in WLAN MAC 450. The software portion of WLAN MAC 450 also programs the corresponding registers to effect channel access control mechanisms according to IEEE 802.11. On obtaining access to the WLAN channel (which is a wireless medium), WLAN MAC 450 forwards the corresponding frame(s) to WLAN baseband 470 on path 457. WLAN MAC 420 may operate correspondingly to process data received, via WLAN baseband 470, on a WLAN channel from external devices/systems, and forward the data to block 421 and the description is not provided in detail in the interest of conciseness.

WLAN baseband 470 receives the data bits (or symbols) of frames from WLAN MAC 450, and modulates a carrier signal with the data bits/symbols. The modulated carrier signal represents a baseband signal according to IEEE 802.11 standard, and WLAN baseband 470 forwards the baseband signal to RF module 490 on path 479. When receiving data from external systems, WLAN baseband 470 extracts data bits/symbols from a modulated carrier received via RF module 490 on path 479, and forwards the data bits/symbols to WLAN MAC 450 for further processing.

WPAN module 440 computes the parameters to be used when wireless device 140 operates as WPAN device 140A. The parameters include the length of operating interval (e.g., time interval t31-t32 of FIG. 3), values of various fields in beacons to be transmitted (if WPAN device 140A is to operate as a router), etc. WPAN module 440 retrieves the provisioning parameters stored in shared memory 415 via path 414, and forwards the provisioning parameters for appropriate further processing and use to WPAN MAC 460 to enable WPAN device 140A to join WPAN 196. WPAN module 440 retrieves commands and instructions stored in shared memory 415 by STA 140C, and processes the commands appropriately. For example, WPAN module may construct corresponding frames containing the commands and forwards the frames to WPAN MAC 460 for transmission on WPAN 196. WPAN module 440 receives 'status' information (as noted above) of devices in WPAN 196 from WPAN chain, and stores the information in shared memory 415. Data other than that for use by STA 140C (via shared memory 415) received from WPAN MAC 460 on path 446 may be stored by WPAN module 440 in data block 441. Such data might represent data received from other devices in WPAN 196 or wired network 150. Similarly, WPAN module 440 may retrieve data destined for devices in WPAN 196 (or in wired network 150) from data block 441, and forward the data to WPAN MAC 460 on path 446.

WPAN MAC 460 performs medium access control operations to enable transmission and reception of data from/to WPAN device 140A. In an embodiment, WPAN MAC 460 is implemented using a combination of software instructions and hardware blocks (primarily registers and queues). The software instructions program the corresponding registers to effect channel access control mechanisms according to IEEE 802.15.4. On obtaining access to the WPAN channel, WPAN MAC 460 forwards the data received from WPAN module 440 to WPAN baseband 480 on path 468. WPAN MAC 460 may operate correspondingly to process data received, via WPAN baseband 480, on the WPAN channel from external devices/systems, and forwards the data to data block 441, and the corresponding description is not provided in the interest of conciseness.

WPAN baseband 480 receives data bits (or symbols) from WPAN MAC 460, and modulates a carrier signal with the data bits/symbols. WPAN baseband 480 forwards the baseband signal to RF module 490 on path 489. When receiving data bits/symbols, WPAN baseband 480 extracts the data bits/symbols from a modulated carrier received via RF module 490, and forwards the data bits/symbols to WPAN MAC 460 for further processing.

RF module 490 is shared by the blocks corresponding to WLAN chain and WPAN chain in a time-multiplexed manner RF module 490 receives a control signal on path 459 to set the carrier frequency of the up-converted signal for WLAN transmission/reception. RF module 490 receives a control signal on path 469 to set the carrier frequency of the up-converted signal for WPAN transmission/reception. Though not shown, RF module 490 contains frequency up-converters and frequency down-converters. The up-converters translate the carrier frequency of the baseband signal to a higher frequency as specified by the corresponding specification (e.g., WLAN or WPAN). The up-converted signal is transmitted to a wireless medium via antenna 499. The down-converters receive a WLAN or WPAN signal via antenna 499, and translate the signal to the corresponding lower (baseband) frequency, and provide the baseband signal on the corresponding one of paths 479 and 489. The specific up-converted frequency (i.e., transmit and receive frequency at antenna 499) may be selected from one of the bands allocated for WLAN and WPAN (e.g., the 2.4 Giga Hertz (GHz), 3.6 GHZ, and 5 GHz frequency bands). The up-converters noted above may be implemented using local oscillators, mixers, low-pass filters and power amplifiers, as is well known in the relevant arts. The down-converters noted above may be implemented include low-noise amplifiers, local oscillators, mixers, and low-pass filters, as is also known in the relevant arts.

Timer 435 represents one or more hardware timers, which is/are programmable to generate one or more interrupts (on path 433) on, for example, expiry of corresponding count values written to it/them.

Concurrent mode controller module 430 schedules the WLAN chain and WPAN chain to operate as described above. Thus, for example, prior to reception of the provisioning parameters for WPAN device 140A, concurrent mode controller 430 enables the WLAN chain for operating wireless device 140 as AP 140B. Then concurrent mode controller module 430 enables the WPAN chain to allow WPAN device 140A to join WPAN 196 using the provisioning parameters. Once WPAN device 140A has joined WPAN 196, concurrent mode controller module 430 schedules the WLAN and WPAN chain for time-division multiplexed operation as STA 140C and WPAN device 140A respectively, as described above. Concurrent mode controller module 430 may program timer 435 with corresponding count values to generate interrupts (e.g., count values for every 400 ms and 500 ms), based on which switching of operation of wireless device 140 as a WPAN device 140A and STA 140C occurs.

Thus, with respect to FIG. 3 for example, concurrent mode controller module 430 may program timer 435 to generate an interrupt at t31. In response, concurrent mode controller module 430 initializes the context of WPAN chain. Concurrent mode controller module 430 programs timer 435 to generate an interrupt at t32, and wireless device 140 operates as STA 140C till t33. Thus, at t32, concurrent mode controller module 430 initializes the context of the WLAN chain.

At t33, timer 435 generates an interrupt (as earlier programmed). In response, concurrent mode controller module 430 suspends the operation of WLAN chain (for example by writing into corresponding registers in WLAN MAC 450), and saves/store the context of the WLAN chain (data structures, register values, etc.) for later restoration. Following the context store of the WLAN chain, concurrent mode controller module 430 restores the data structures and register values representing the previously saved context (data structures, register values, etc.) of WPAN chain. Concurrent mode controller module 430 performs corresponding operations to generate interrupts and saving and restoring of contexts of the corresponding chains (WLAN chain and WPAN chain) to enable wireless device 140 to operate as WPAN device 140A and STA 140C in TDM fashion.

In the embodiments in which wireless device 140 operates alternately as WPAN device 140A/AP 140B in a TDM manner, and as WPAN device 140A/STA 140C/AP 140B in a TDM manner, the operations of the blocks of FIG. 4 (in particular blocks 430 and 435) would be correspondingly modified, as would be apparent to one skilled in the relevant arts upon reading the disclosure herein.

Host interface 410 provides electrical and protocol interfaces to enable connection of wireless device 140 with an external device/system. The external system could, for example, be a computer, and may be used for troubleshooting errors in operation of wireless device 140, as well as for loading software and/or firmware instructions to corresponding blocks of FIG. 4.

It should be further appreciated that a wireless device can be enabled with the features described above as a desired combination of one or more of hardware, executable modules, and firmware. The description is continued with respect to an alternative view of the details of FIG. 4.

6. Digital Processing System

Figure 5:
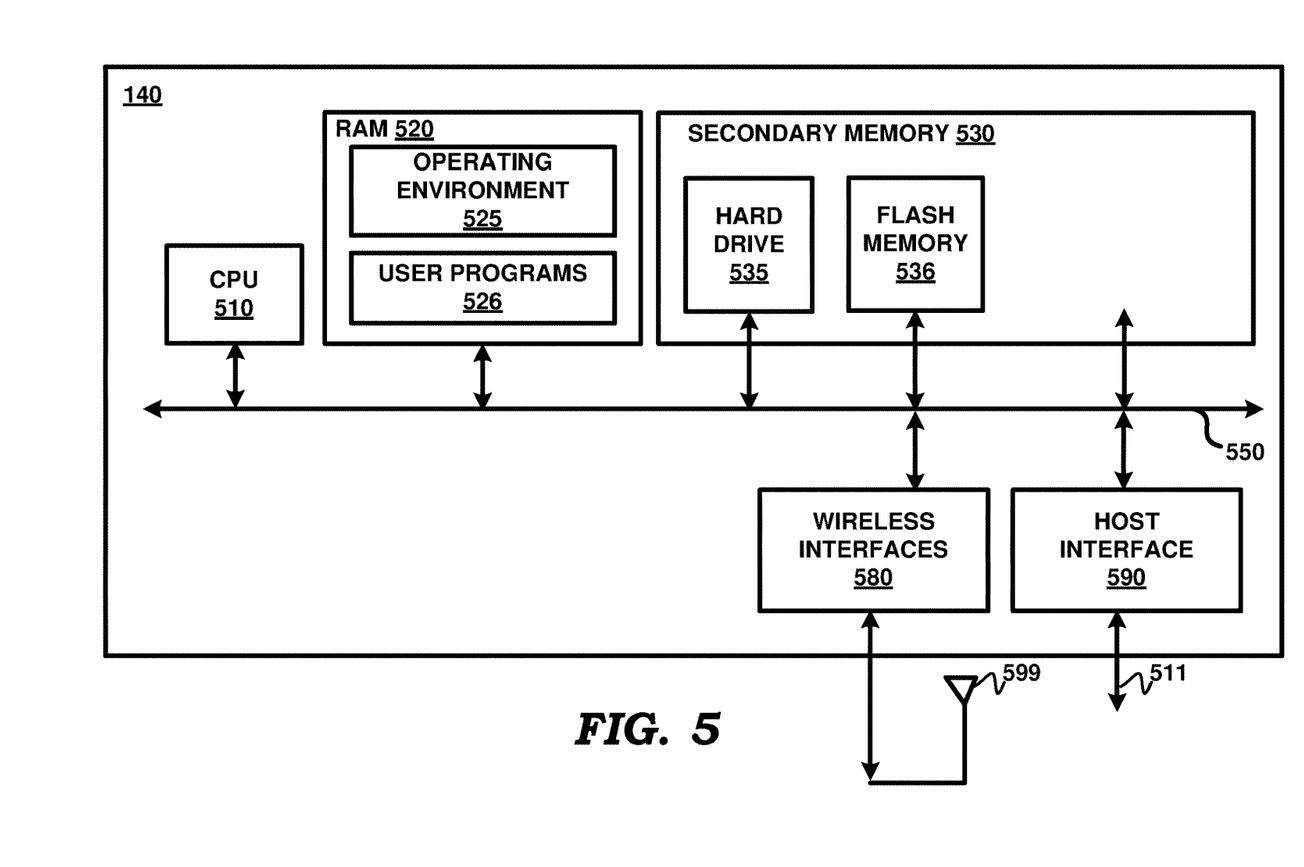
FIG. 5 is a block diagram illustrating the details of a wireless device in an alternative view, in an embodiment of the present disclosure.

FIG. 5 is a block diagram illustrating the details of wireless device 140 in an alternative view. Wireless device 140 may contain one or more processors such as a central processing unit (CPU) 510, random access memory (RAM) 520, secondary memory 530, wireless interfaces 580 and host interface 590. All the components may communicate with each other over communication path 550, which may contain several buses as is well known in the relevant arts.

CPU 510 may execute instructions stored in RAM 520 to provide several features of the present disclosure. CPU 510 may contain multiple processing units, with each processing unit potentially being designed for a specific task. Such one or more processors may be together referred to as a processor block. Alternatively, CPU 510 may contain only a single general-purpose processing unit.

RAM 520 may receive instructions from secondary memory 530 (non-transitory/non-volatile machine readable medium) via communication path 550. RAM 520 is shown currently containing software instructions constituting operating environment 525 and/or other code/programs 526. In addition to operating environment 525, RAM 520 may contain other software programs such as device drivers, etc., which provide a (common) run time environment for execution of code/programs/applications (in the form of execution entities).

Secondary memory 530 is shown containing hard drive 535 and flash memory 536. Secondary memory 530 stores data and software instructions (code), which enable wireless device 140 to provide several features in accordance with the present disclosure. Thus, secondary memory 530 may store software instructions representing modules 420, 430, 440, and the corresponding software portions of modules 450 and 460 of FIG. 4. The software instructions (and additionally configuration data) may either be copied to RAM 520 prior to execution by CPU 510, or may be executed directly from flash memory 536.

Host interface 590 corresponds to host interface 410 of FIG. 4. Wireless interfaces 580 represents the combination of modules 470, 480, 490 and the hardware portions of modules 450 and 460.

CPU 510 executes instructions stored in RAM 520 to enable operation of wireless device 140 as a STA/AP and a WPAN device, as described in detail above.

7. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method performed in a wireless device for provisioning said wireless device to operate as a part of a second wireless network using a second layer-2 wireless protocol, said method being performed in said wireless device, said method comprising:
    operating as a wireless device in a first wireless network using a first layer-2 wireless protocol;
    receiving a set of provisioning parameters for the wireless device to use to join said second wireless network, wherein said wireless device was not previously part of said second wireless network, wherein said first wireless network is based on a shared wireless broadcast medium, wherein said set of provisioning parameters includes a network ID of the second wireless network; and
    joining said second wireless network using said second layer-2 wireless protocol using said set of provisioning parameters.

2. The method of claim 1, wherein said operating comprises communicating with a provisioning agent operating as another wireless device of said first wireless network,
    wherein said provisioning parameters are received from said provisioning agent on said first wireless network using said first layer-2 wireless protocol.

3. The method of claim 2, wherein said wireless device operates as an access point of said first wireless network and said provisioning agent operates as a wireless station of said first wireless network in transferring said provisioning parameters from said provisioning agent to said wireless device.

4. The method of claim 3, after completion of provisioning to operate as a part of said second wireless network, said method further comprising:
    joining a third wireless network as a wireless station using said first layer-2 wireless protocol;
    receiving a plurality of data elements from wireless devices in said second wireless network using said second layer-2 wireless protocol; and
    transmitting said plurality of data elements to an access point of said third wireless network using said first layer-2 wireless protocol.

5. The method of claim 4, wherein said wireless device operates in a time division multiplexed (TDM) mode as part of said second wireless network and third wireless network in alternate durations using a single RF (radio frequency) module, wherein said plurality of data elements are received in one duration while operating only as part of said second wireless network and transmitted in another duration while operating only as part of said third wireless network.

6. The method of claim 5, wherein said first layer-2 wireless protocol is according to Wireless Local Area Network (WLAN) technology, and said second layer-2 wireless protocol is according to Wireless Personal Area Network (WPAN) technology.

7. The method of claim 6, wherein said plurality of data elements represent status of wireless devices in said second wireless network.

8. The method of claim 5, further comprising transmitting, to said access point of said third wireless network, data specifying whether said joining is successful.

9. The method of claim 3, after completion of provisioning to operate as a part of said second wireless network, said method further comprising:
    receiving a plurality of data elements from wireless devices in said second wireless network using said second layer-2 wireless protocol; and
    transmitting said plurality of data elements to said provisioning agent on said first wireless network using said first layer-2 wireless protocol.

10. The method of claim 9, wherein said wireless device operates in a time division multiplexed (TDM) mode as part of said second wireless network and said first wireless network in alternate durations using a single RF (radio frequency) module, wherein said plurality of data elements are received in one duration while operating only as part of said second wireless network and transmitted in another duration while operating only as part of said first wireless network.

11. A non-transitory machine readable medium storing one or more sequences of instructions for operating a wireless device of a wireless network, wherein execution of said one or more instructions by one or more processors contained in said wireless device enables said wireless device to perform the actions of:
    operating as a wireless device in a first wireless network using a first layer-2 wireless protocol;
    receiving a set of provisioning parameters for the wireless device to use to join said second wireless network, wherein said wireless device was not previously part of said second wireless network, wherein said first wireless network is based on a shared wireless broadcast medium, wherein said set of provisioning parameters includes a network ID of the second wireless network; and
    joining said second wireless network using said second layer-2 wireless protocol using said set of provisioning parameters.

12. The non-transitory machine readable medium of claim 11, wherein said operating comprises communicating with a provisioning agent operating as another wireless device of said first wireless network,
    wherein said provisioning parameters are received from said provisioning agent using said first layer-2 wireless protocol.

13. The non-transitory machine readable medium of claim 12, wherein said wireless device operates as an access point of said first wireless network and said provisioning agent operates as a wireless station of said first wireless network in transferring said provisioning parameters from said provisioning agent to said wireless device.

14. The non-transitory machine readable medium of claim 13 further comprising instructions for enabling said wireless device, after completion of provisioning to operate as a part of said second wireless network, to perform the actions of:

joining a third wireless network as a wireless station using said first layer-2 wireless protocol;

receiving a plurality of data elements from wireless devices in said second wireless network using said second layer-2 wireless protocol; and transmitting said plurality of data elements to an access point of said third wireless network using said first layer-2 wireless protocol.

15. The non-transitory machine readable medium of claim 13, wherein said wireless device operates in a time division multiplexed (TDM) mode as part of said third wireless network and said second wireless network in alternate durations using a single RF (radio frequency) module, wherein said plurality of data elements are received in one duration while operating only as part of said second wireless network and transmitted in another duration while operating only as part of said third wireless network.

16. The non-transitory machine readable medium of claim 15, wherein said first layer-2 wireless protocol is according to Wireless Local Area Network (WLAN) technology, and said second layer-2 wireless protocol is according to Wireless Personal Area Network (WPAN) technology.

17. The non-transitory machine readable medium of claim 16, wherein said plurality of data elements represent status of wireless devices in said second wireless network.

18. A wireless device comprising:

a processor block and a memory, said memory to store instructions which when retrieved and executed by said processor block causes said wireless device to perform the actions of:

operating as a wireless device in a first wireless network using a first layer-2 wireless protocol;

receiving a set of provisioning parameters for the wireless device to use to join said second wireless network, wherein said wireless device was not previously part of said second wireless network, wherein said first wireless network is based on a shared wireless broadcast medium, wherein said set of provisioning parameters includes a network ID of the second wireless network; and joining said second wireless network using said second layer-2 wireless protocol using said set of provisioning parameters.

19. The wireless device of claim 18, wherein said operating comprises communicating with a provisioning agent operating as another wireless device of said first wireless network, wherein said provisioning parameters are received from said provisioning agent on said first wireless network using said first layer-2 wireless protocol.

20. The wireless device of claim 19, wherein said wireless device operates as an access point of said first wireless network and said provisioning agent operates as a wireless station of said first wireless network in transferring said provisioning parameters from said provisioning agent to said wireless device, wherein said processor block causes said wireless device, after completion of provisioning to operate as a part of said second wireless network, to further perform the actions of:

joining a third wireless network as a wireless station using said first layer-2 wireless protocol;

receiving a plurality of data elements from wireless devices in said second wireless network using said second layer-2 wireless protocol; and transmitting said plurality of data elements to an access point of said third wireless network using said first layer-2 wireless protocol, wherein said wireless device operates in a time division multiplexed (TDM) mode as part of said third wireless network and said second wireless network in alternate durations using a single RF (radio frequency) module, wherein said plurality of data elements are received in one duration while operating only as part of said second wireless network and transmitted in another duration while operating only as part of said third wireless network.

21. The method of claim 1, wherein said set of provisioning parameters comprise a unique identifier of said second wireless network, a pass-phrase, and a channel number, wherein said joining comprises transmitting said pass-phrase on a channel identified by said channel number to a switch operating within said second wireless network identified by said unique identifier.

* * * * *